(12) United States Patent
Ohno

(10) Patent No.: US 6,804,032 B2
(45) Date of Patent: Oct. 12, 2004

(54) IMAGE RECORDING DEVICE

(75) Inventor: Takehisa Ohno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 226 days.

(21) Appl. No.: 10/093,375

(22) Filed: Mar. 11, 2002

(65) Prior Publication Data
US 2002/0131028 A1 Sep. 19, 2002

(30) Foreign Application Priority Data

Mar. 16, 2001 (JP) ........................................ 2001-075604

(51) Int. Cl.[7] ................................................ H04N 1/04
(52) U.S. Cl. ...................... 358/498; 358/488; 271/3.14; 271/3.19
(58) Field of Search ................................ 358/474, 476, 358/479, 486, 488, 493, 494, 496, 497, 498; 271/3.14, 3.19

(56) References Cited

U.S. PATENT DOCUMENTS

| | | | | |
|---|---|---|---|---|
| 5,014,929 A | * | 5/1991 | Kato et al. | 242/335 |
| 5,042,056 A | * | 8/1991 | Hellmick et al. | 378/173 |
| 5,448,348 A | * | 9/1995 | Azeta | 355/319 |
| 5,661,542 A | * | 8/1997 | Morita | 355/27 |
| 5,956,071 A | * | 9/1999 | Mattila et al. | 347/262 |
| 6,262,752 B1 | * | 7/2001 | Suzuki et al. | 346/134 |

FOREIGN PATENT DOCUMENTS

| | | | | |
|---|---|---|---|---|
| EP | 0873958 | * | 10/1998 | B65H/20/02 |
| JP | 02089760 | * | 3/1990 | B65H/23/34 |
| JP | 11-52642 | * | 2/1999 | G03G/15/00 |
| JP | 2000-63006 | * | 2/2000 | B41J/13/00 |
| JP | 2002-277972 | * | 9/2002 | G03B/27/46 |

* cited by examiner

Primary Examiner—Jerome Grant, II
(74) Attorney, Agent, or Firm—Sughrue Mion, PLLC

(57) ABSTRACT

An image recording device includes a standby device and a retracting device. Before processing for recording an image on a photosensitive material is implemented, the standby device conveys a leading edge of the photosensitive material to a standby position at a curved region on a conveyance path, with the curved region having a relatively small radius of curvature, whereby the photosensitive material is made to stand by. Before the leading edge of the photosensitive material is able to retain the curved shape of the curved region of the conveyance path and cause the photosensitive material to become jammed in the image recording device during conveyance, the retracting device moves the leading edge of the photosensitive material to a retraction position, where the leading edge is disposed along a linear region of the conveyance path or along a curve on the conveyance path that has a relatively large radius of curvature.

19 Claims, 7 Drawing Sheets

IMAGE RECORDING DEVICE

BACKGROUND OF THE INVENTION

1. Field of the Invention

The present invention relates to an image recording device which exposes a photosensitive material with light to form an image thereon.

2. Description of the Related Art

Photoprinters (photographic printing/developing devices) and printers that record images on various types of photosensitive materials, such as silver photographic photosensitive materials, heat-developing photosensitive materials and light- and heat-sensitive recording materials, are included among conventional image recording devices.

As shown in FIG. 7, some image recording devices use a long sheet-like recording paper as a photosensitive material 200. When a long recording paper is used as the photosensitive material 200, the photosensitive material 200 is wound around an axial member and stored as a photosensitive material roll 202 in a light-blocking magazine 204.

The magazine 204 is mounted to a photosensitive material supplying section 206. A leading edge of the photosensitive material 200 is pulled out from an opening in the magazine 204 by a conveying device disposed in the image recording device. Then, the leading edge of the photosensitive material 200 which was pulled out from the opening is conveyed on a serpentine conveyance path, and is stopped before a printing/conveyance section 210 and made to stand by so that the photosensitive material 200 can readily be printed and exposed.

Next, when a print order is inputted to the image recording device, the conveying device conveys by a short distance to the printing/conveyance device 210 the photosensitive material 200 that is standing by, whereby a predetermined portion of the photosensitive material 200 is positioned at an exposure position 212 on the conveyance path and then stopped.

In this state, an exposure section 214 irradiates light transmitted through a negative film set by a film carrier 216 upon the predetermined portion of the photosensitive material 200 to print and expose the same.

At the time printing/exposure processing is performed, frame information is created by an unillustrated puncher on each print. Sort information indicating film boundaries (e.g., boundary between a first photographic film and a second photographic film) is also formed by the puncher.

A back print is recorded on a back surface of the printed and exposed portion of the photosensitive material 200, and then the photosensitive material is conveyed on the conveyance path by the conveying device to a development section 218.

While the photosensitive material 200 is conveyed in the development section 218 at a predetermined speed by the conveying device, the printed and exposed portion is successively immersed in a development solution within a color development tank 220, a bleaching/fixing solution within a bleaching/fixing tank 222 and water within washing tanks 224. In this way, the printed and exposed portion is successively color-developed, bleached/fixed and washed, whereby the printed and exposed portion is developed.

The developed portion of the photosensitive material 200 is then passed through a drying section 225 by the conveying device to be dried, and then conveyed to a discharge section 226. At the discharge section 226, the frame information formed at the time of printing/exposure is detected and the photosensitive material 200 is cut into prints in accordance with the frame information to make finished prints.

The finished prints are accommodated in a sorter 228 based on the sort information creates at the time of printing/exposure.

In the above-described conventional image recording device, in order to reduce processing time, the leading edge of the photosensitive material 200 is pulled out from the magazine 204 by the conveying device and is made to stand by before the printing/conveyance section 210 on the conveyance path so that the photosensitive material 200 can readily be printed and exposed.

Such image recording devices are not limited to the kind in which an operator always inputs print orders and each process is successively and continuously carried out while the photosensitive material 200 is conveyed by the conveying device.

For example, processing within the recording device is also frequently performed intermittently. In this case, a print order is inputted to the image recording device and print processing for the order is carried out. After an uncertain period of time, another print order is inputted and print processing for the order is carried out.

When processing is performed intermittently, the leading edge of the photosensitive material 200 is made to stand by at a curved region of the conveyance path until a print order for a next print is inputted. When the period of time in which the photosensitive material 200 is made to stand by becomes long, the curved leading edge of the photosensitive material 200 becomes plastically deformed and can retain the shape (i.e., a curl having a small diameter) of the curved region of the conveyance path at which it was made to stand by.

When the leading edge of the photosensitive material 200 retains the shape of the curved region of the conveyance path at which it was made to stand by and becomes curled as a result, there is the potential for conveyance of the photosensitive material 200 to be hindered or for the photosensitive material 200 to become jammed in the image recording device when the curled leading edge is advanced by the conveying device on the serpentine conveyance path. Moreover, when the curled photosensitive material 200 is processed and an image is recorded thereon, the finished print may be curled as well.

SUMMARY OF THE INVENTION

In view of the above-described facts, an object of the present invention is to provide an image recording device that can prevent a photosensitive material from retaining the shape of a path along which the photosensitive material is conveyed, even when the photosensitive material is made to stand by on the conveyance path.

An image recording device relating to a first aspect of the present invention, comprising: a standby device for conveying, before processing for recording an image on a photosensitive material is implemented, a leading edge of the photosensitive material to a standby position at a curved region on a conveyance path, with the curved region having a relatively small radius of curvature, to thereby make the leading edge of the photosensitive material stand by; and a retracting device for moving, before the leading edge of the photosensitive material retains a curved shape of the conveyance path enough to cause the photosensitive material to become jammed in the image recording device, the leading edge of the photosensitive material to a retraction position, the retraction position being one of a position at which the leading edge can be held linearly on the conveyance path and a position at which the leading edge can be held along a curve, on the conveyance path, having a relatively large radius of curvature.

In the image recording device of the first aspect, if the period of time in which the photosensitive material is made to stand by becomes long, the retracting device moves the leading edge of the photosensitive material from the standby state, in which the leading edge is curved, to the retracted state, in which the leading edge is curved more largely or linearly extended. The retracting device moves the leading edge to the retracted state before the curved leading edge is able to retain the shape of the curved region of the conveyance path at which it was made to stand by and cause the photosensitive material to become jammed in the image recording device. Therefore, even if the period of time in which the photosensitive material is made to stand by becomes long, it is possible to prevent the leading edge of the photosensitive material from retaining the curved shape of the conveyance path. Hence, it is possible to prevent the photosensitive material from becoming jammed in the image recording device when the curled leading edge is advanced by the conveying device on the serpentine conveyance path, and to prevent conveyance of the photosensitive material from becoming hindered. Moreover, it is also possible to prevent finished prints from being curled after the photosensitive material has been subjected to various image recording processing and an image has been recorded on the photosensitive material.

The image recording device relating to a second aspect of the present invention, comprising: a standby device for conveying, before processing for recording an image on a photosensitive material is implemented, a leading edge of the photosensitive material to a standby position at a curved region on a conveyance path, with the curved region having a relatively small radius of curvature, to thereby make the leading edge of the photosensitive material stand by; a retracting device for moving, before the leading edge of the photosensitive material retains a curved shape of the conveyance path enough to cause the photosensitive material to become jammed in the image recording device, the leading edge of the photosensitive material to a retraction position, the retraction position being one of a position at which the leading edge can be held linearly on the conveyance path and a position at which the leading edge can be held along a curve, on the conveyance path, having a relatively large radius of curvature; and a return device for returning the leading edge of the photosensitive material that is retracted at the retraction position to the standby position on the conveyance path when indication that input of an order to implement image recording has begun is detected.

In the image recording device of the second aspect, if the period of time in which the photosensitive material is made to stand by becomes long, the retracting device moves the leading edge of the photosensitive material from the standby state, in which the leading edge is curved, to the retracted state, in which the leading edge is curved more largely or linearly extended. The retracting device moves the leading edge to the retracted state before the curved leading edge is able to retain the shape of the curved region of the conveyance path at which it was made to stand by and cause the photosensitive material to become jammed in the image recording device. Therefore, even if the period of time in which the photosensitive material is made to stand by becomes long, it is possible to prevent the leading edge of the photosensitive material from retaining the curved shape of the conveyance path. Hence, it is possible to prevent the photosensitive material from becoming jammed in the image recording device when the curled leading edge is advanced by the conveying device on the serpentine conveyance path, and to prevent conveyance of the photosensitive material from becoming hindered. Moreover, it is also possible to prevent finished prints from being curled after the photosensitive material has been subjected to various image recording processing and an image has been recorded on the photosensitive material. In addition, when it has been detected that an operator has initiated an operation for inputting an order to implement image recording, the return device conveys the leading edge of the photosensitive material, which has been retracted to the retraction position, to the standby position at a curved region of the conveyance path, whose radius of curvature on the conveyance path is relatively small, and the leading edge is made to stand by. Thus, when the order for image recording has been inputted to the image recording device, the leading edge of the photosensitive material is readily conveyed to the processing sections and processing is readily performed, whereby overall processing speed of the image recording device can be reduced.

Preferably, in the image recording device of the second aspect, the retraction position is one of in the vicinity of and within a magazine for accommodating a long roll of the photosensitive material.

By using the above-described structure, the long photosensitive material can be wound in the magazine and appropriately held in the vicinity of or within the magazine.

Preferably, in the image recording device of the second aspect, the retraction position is within a feed cassette for accommodating the photosensitive material that has been cut into a predetermined size.

By using the above-described structure, the photosensitive material cut into a predetermined size can be stored in the feed cassette and appropriately held therein.

Preferably, the image recording device of the second aspect further comprises a control device for controlling the standby device, the retracting device and the return device.

Further preferably, in the image recording device of the second aspect, the control device includes a timer, and when a period of time at which the leading edge of the photosensitive material is positioned at the standby position is equal to or exceeds a predetermined amount of time counted by the timer, the leading edge of the photosensitive material is moved from the standby position to the retraction position.

Preferably, the image recording device of the second aspect further comprises an input device including at least one of an operation key, an exterior mouse and an exterior keyboard for inputting an order to implement processing for image recording.

Further preferably, in the image recording device of the second aspect, the return device returns the leading edge of the photosensitive material that is retracted at the retraction position to the standby position on the conveyance path when it has been detected that the operation key has been operated.

When it has been detected that operation keys disposed at the image recording device have been operated, the return device determines that an operator has inputted an order to effect image recording, and the return device restores the photosensitive material to the standby state. Accordingly, preparation can be automatically made to readily initiate processing for the purpose of image recording in the image recording device.

Preferably, in the image recording device of the second aspect, the return device returns the leading edge of the photosensitive material that is retracted at the retraction position to the standby position on the conveyance path when operation of the exterior mouse is detected.

Preferably, in the image recording device of the second aspect, the return device returns the leading edge of the photosensitive material that is retracted at the retraction position to the standby position on the conveyance path when operation of the exterior keyboard is detected.

When it has been detected that the external mouse or keyboard has been operated, the return device determines that an operator has inputted an order to effect image recording, and the return device restores the photosensitive material to the standby state. Accordingly, preparation can be automatically made to readily initiate processing for the purpose of image recording in the image recording device.

The image recording device relating to a third aspect of the present invention is, an image recording device including an exposure section for printing an image onto a photosensitive material, the image recording device comprising: a standby device for conveying, before processing for recording the image on the photosensitive material is implemented, a leading edge of the photosensitive material along a conveyance path including linear and curved regions to a standby position near the exposure section, to thereby make the leading edge of the photosensitive material stand by; a retracting device for moving, before the leading edge of the photosensitive material standing by at the standby position retains a curved shape of the conveyance path enough to cause the photosensitive material to become jammed in the image recording device, the leading edge of the photosensitive material to a retraction position, the retraction position being one of a position at which the leading edge can be held linearly on the conveyance path and a position at which the leading edge can be held along a curve, on the conveyance path, having a relatively large radius of curvature; and a return device for returning the leading edge of the photosensitive material that is retracted at the retraction position to the standby position on the conveyance path when indication that input of an order to implement image recording has begun is detected.

Preferably, the image recording device of the third aspect further comprises an input device for inputting an order to implement processing for image recording.

Preferably, in the image recording device of the third aspect, the return device returns the leading edge of the photosensitive material that is retracted at the retraction position to the standby position on the conveyance path when it has been detected that the input device has been operated.

Preferably, the image recording device of the third aspect further comprises a control device for controlling the standby device, the retracting device and the return device.

Preferably, in the image recording device of the third aspect, the control device includes a timer, and when a period of time at which the leading edge of the photosensitive material is positioned at the standby position is equal to or exceeds a predetermined amount of time counted by the timer, the leading edge of the photosensitive material is moved from the standby position to the retraction position.

DESCRIPTION OF THE PREFERRED EMBODIMENT

An embodiment of the present invention will be described with reference to FIGS. 1 through 6.

Figure 1:
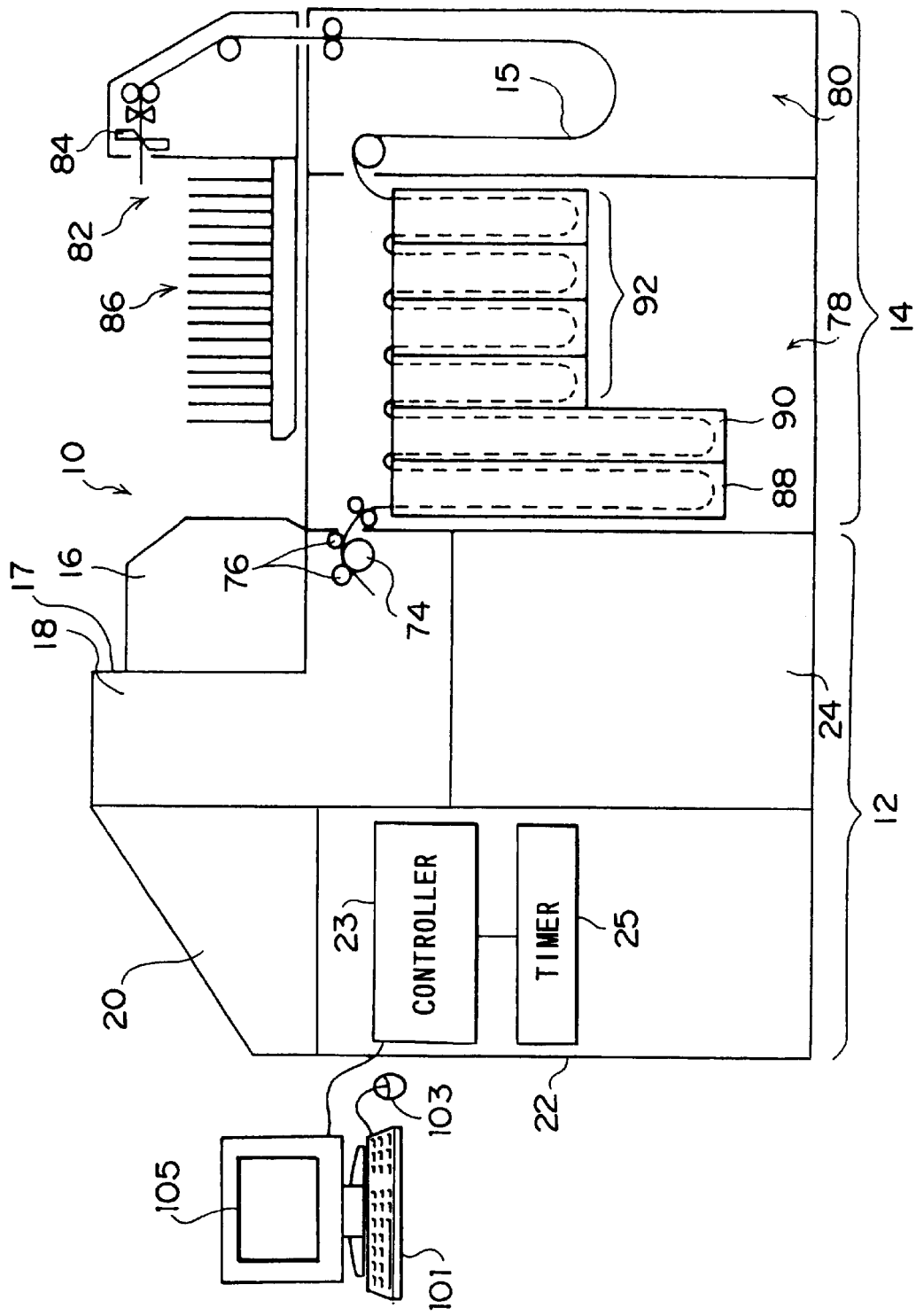
FIG. 1 is a schematic structural view of the whole image recording device relating to an embodiment of the present invention.

FIG. 1 shows a schematic structure of an image recording device 10 according to the present invention, the image recording device 10 being used is for a digital photo printer.

When an operational command for ordering a print is inputted, the image recording device 10 sets a photographic film on a scanner and reads image information. A photosensitive material is scan-exposed with a light beam that has been processed in accordance with exposure conditions (image recording conditions) determined based on the read image information by a set-up device, whereby a latent image is formed on the photosensitive material. The photosensitive material having the latent image formed thereon is then developed, and a print on which the image of the photographic film has been recorded is outputted.

As shown in FIG. 1, the image recording device 10 comprises a printer section 12 and a processor section 14. The printer section 12 includes a conveyance section 18, an image processing section 20, an electric equipment section 22, and a reservoir 24 for temporarily storing the photosensitive material once it has been exposed.

The image processing section 20 photoelectrically reads, by use of an image sensor such as a CCD sensor, light transmitted through an image recorded on a film, converts analog image data of the film read by the image sensor into digital image data, performs predetermined image processing of the digital image data (including gradation correction), and outputs image data (exposure conditions) for image recording.

The electric equipment section 22 accommodates a power supply and a control unit including a control device 23. The control device 23 has a timer 25 for controlling the various sections of the image recording device 10. Connected to the control device 23 are various types of operation keys (not shown) disposed in the image processing section 20. The operation keys form an input section that serves as an interface utilizable for inputting an operational command for ordering a print. Also connected to the control device 23 are an exterior keyboard 101, a mouse 103 and a display 105.

Figure 2:
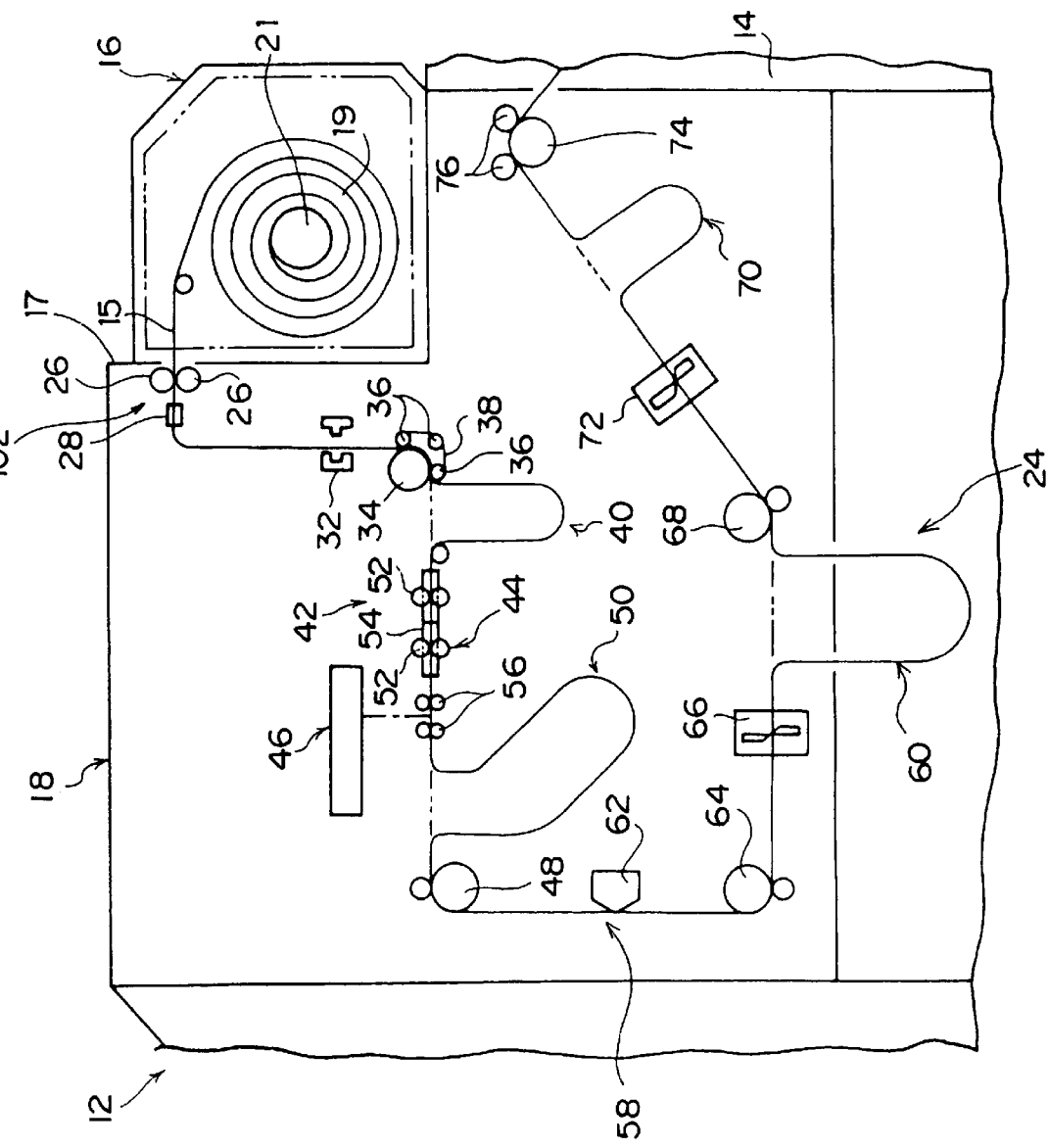
FIG. 2 is a schematic structural view of a printer section of the image recording device relating to the embodiment of the present invention.

As shown in FIG. 2, the printer section 12 further includes a mount 17 at which a substantially box-shaped, light-blocking magazine 16 is detachably mounted. The magazine 16 accommodates and supplies a long, sheet-like photosensitive material 15 that is wound around an axial member 21 to form a photosensitive material roll 19.

The conveyance section 18 includes a device for conveying the photosensitive material 15 along a predetermined path through the conveyance section 18 after the photosensitive material 15 is pulled out from the magazine 16 mounted at the mount 17. While the conveying device conveys the photosensitive material 15, image position information is recorded, an image is exposed (printing), and a back print is recorded on a back surface of the photosensitive material 15. Thereafter, the photosensitive material 15 is conveyed to a development section 78 disposed in the processor section 14.

The magazine 16 supports the axial member 21 of the photosensitive material roll 19 accommodated in the magazine 16. An unillustrated rewinding device is mounted to the magazine 16. The axial member 21 is rotated by the rewinding device, whereby the photosensitive material 15 that has been pulled out from the photosensitive roll 19 can be rewound again into the photosensitive roll 19.

Figure 3:
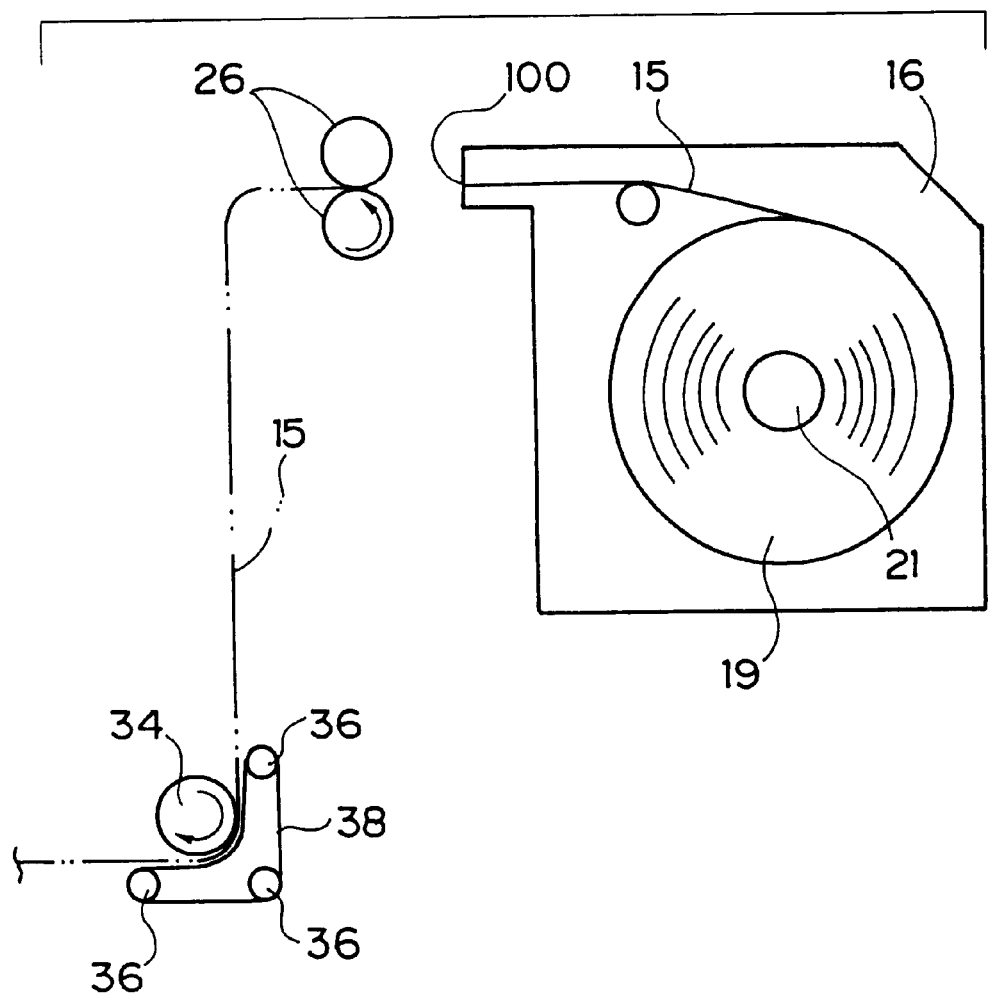
FIG. 3 is a schematic structural view of a main part of a path along which a photosensitive material is conveyed in the printer section of the image recording device, the main part of the conveyance path being from a magazine accommodating the entire photosensitive material to a curved region of the path that has a relatively small radius of curvature.

As shown in FIG. 3, the magazine 16 includes a slit 100 through which the photosensitive material 15 is pulled out from the photosensitive material roll 19 accommodated in the magazine 16 and supplied to the conveying section 18. The slit 100 is formed in a portion of the magazine 16 that protrudes.

A conveyance roller device 26 is disposed in the conveying section 18 to correspond to the slit 100 when the magazine 16 is mounted at the mount 17. The conveyance roller device 26 includes a driving device, such as a solenoid, that drives a pair of rollers movable close to and away from each other. The rollers nip a leading edge of the photosensitive material 15 that protrudes from the slit 100 and are rotatably driven to convey the photosensitive material 15 on the conveyance path.

A first alignment member 28 (see FIG. 2) for aligning in a width direction (i.e., transverse direction) width-direction edges of the photosensitive material 15 is disposed downstream (in the direction in which the photosensitive material 15 is conveyed) from the conveyance roller device 26. The first alignment member 28 includes a guide mechanism (not shown) for aligning the photosensitive material 15 in accordance with the width of the photosensitive material 15.

A puncher 32 is disposed downstream from the first alignment member 28 at a linear region of the conveyance path. The puncher 32 punches holes in the photosensitive material 15. The punch holes are formed at the photosensitive material 15 in order for a detector to detect cutting of the photosensitive material 15 performed in a discharge section 82, exposure and scanning, back printing, positional information per print and positional information per set number of prints per film.

Disposed downstream from the puncher 32 are a conveyance roller 34, for changing by substantially 90° the direction in which the photosensitive material 15 is conveyed, and an endless belt 38 that opposes the conveyance roller 34 and is entrained around three guide rollers 36. The curve along which the photosensitive material 15 is conveyed by the conveyance roller 34 has a relatively small radius of curvature. In this way, a curved region is formed on the conveyance path of the photosensitive material 15.

A first loop (slack) 40 having a substantial U-shape when seen in side view is formed on the conveyance path downstream from the guide roller 36, an exposure section 42 is disposed downstream from the first loop 40, and a second loop 50 having a substantial U-shape when seen in side view is formed downstream from the exposure section 42.

The hole punched in the photosensitive material 15 by the puncher 32 is detected in the exposure section 42 to determine a position at which image exposure is to be initiated. While the photosensitive material 15 is conveyed by a sub-scanning conveyance device 44 in a sub-scanning direction (i.e., from right to left in FIG. 2), the photosensitive material 15 is two-dimensionally scan-exposed by a light beam scanning device 46 with a light beam deflected in a main scanning direction that is orthogonal to the sub-scanning direction (i.e., vertical to the page surface of FIG. 2).

The sub-scanning conveying device 44 includes a second alignment member 54 and two pairs of registration rollers 52 for guiding the photosensitive material 15 to a position at which the photosensitive material 15 is exposed (hereinafter, may be referred to as "exposure position"). Two pairs of conveying rollers 56 are also disposed downstream from the registration rollers 52 and the second alignment member 54. Thus, the photosensitive material 15 can be precisely conveyed to the exposure position.

The light beam scanning device 46 two-dimensionally scan-exposes the photosensitive material 15 with a light beam modulated on the basis of the image data (exposure conditions) outputted from the image processing section 20 and deflected in the main scanning direction, whereby a latent image is formed on the photosensitive material 15.

The first loop 40 and the second loop 50 absorb so-called back tension and taut of the photosensitive material 15 caused by the upstream and downstream conveying devices (conveyance rollers) when the photosensitive material 15 is conveyed in the sub-scanning conveying device 44. As a result, the photosensitive material 15 can be conveyed with high precision.

A conveyance roller 48, for changing by substantially 90° the direction in which the photosensitive material 15 is conveyed, is disposed downstream from the second loop 50. Additionally, a back-printing section 58 that includes a printing device 62 is disposed downstream from the conveyance roller 48. The printing device 62 records various data, such as dates photographs represented by images on an original film were taken and dates images were recorded on the photosensitive material 15, on a back surface of the photosensitive material 15.

A conveyance roller 64, for changing by substantially 90° the direction in which the photosensitive material 15 is conveyed, is disposed downstream from the back-printing section 58. A first cutter 66 is disposed downstream from the conveyance roller 64, and cuts the photosensitive material 15 at a required position.

A third loop 60, which is accommodated in a reservoir 24 and has a substantial U-shape when seen in side view, is formed downstream from the first cutter 66. The third loop 60 compensates for differences in the speeds at which the photosensitive material 15 is processed in the printer section 12 and in the processor section 14, so that prints are formed efficiently.

A conveyance roller 68 is disposed downstream from the third loop 60, and a second cutter 72 is disposed downstream from the conveyance roller 68. The second cutter 72 cuts the photosensitive material 15 when, for example, an amount of the photosensitive material 15 accommodated in the reservoir 34 is equal to or less than a predetermined amount, or when any troubles arise. Consequently, it is possible to eliminate adversity to the photosensitive material 15 which will be accommodated in the reservoir 34 and to prevent damage to respective conveyance devices within the conveyance section 18 caused by the photosensitive material 15 being unnecessarily pulled in the processor section 14.

A fourth loop 70 having a substantial U-shape when seen in side view is formed downstream from the second cutter 72. The fourth loop 70 finally compensates for differences in the speed at which the photosensitive material 15 is processed in the conveyance section 18 and the processor section 14. The fourth loop 70 also compensates for conveyance/stopping of the photosensitive material 15 by conveyance devices in the conveying section 18. Consequently, it is possible to prevent the photosensitive material 15 from being unnecessarily pulled by the conveyance devices within the processor section 14 and being damaged.

A final conveyance roller 74, for supplying the photosensitive material 15 to the processor section 14, and two nip rollers 76, which oppose the conveyance roller 74 and are disposed with a predetermined interval therebetween, are disposed downstream from the fourth loop 70. The conveyance roller 74 and nip rollers 76 supply the exposed photosensitive material 15 to the development section 78 within the processor section 14.

As shown in FIG. 1, the processor section 14 comprises the development section 78, the drying section 80, the discharge section 82 and a sorter section 86. The development section 80 develops, fixes and washes the exposed photosensitive material 15 having the latent image formed thereon; the drying section 80 dries the photosensitive material 15; the discharge section 82 includes a third cutter 84 for cutting the long photosensitive material 15 into image frames at predetermined lengths; and the sorter section 86 stores the finished prints. The processor section 14 further includes conveyance devices (e.g., conveyance rollers) for conveying the exposed photosensitive material 15 through the sections of the processor section 14 after the photosensitive material 15 is supplied from the printer section 12.

The development section 78 includes a development tank 88, a fixing tank 90 and washing tanks 92. While being conveyed in a loopwise manner (substantial U-shape when seen in side view) within the tanks as indicated by broken lines in FIG. 1, the exposed photosensitive material 15 is developed, fixed and washed, then accommodated in the drying section 80 in a loop (having a substantial U-shape when seen in side view), and then conveyed to the discharge section 82.

Finished prints are discharged at the discharge section 82 to then be automatically sorted and stored in a predetermined place at the sorter section 86.

The control device 23 disposed with the timer 25 controls operations for implementing various processing while the photosensitive material 15 that has been pulled out from the magazine 16 is conveyed, so that the operations are automatically implemented.

Additionally, the control device 23 controls the various sections of the image recording device 10 on the basis of command signals inputted by an operator using operation keys (not shown) disposed in the image processing section 20, the keyboard 101, the mouse 103 and the display 105. The control device 23 also controls ordinary processing for image recording of the photosensitive material 15 as well as implements retraction of the photosensitive material 15 when processing is inactive.

Next, ordinary processing control by the control device 23 will be explained.

Figure 4:
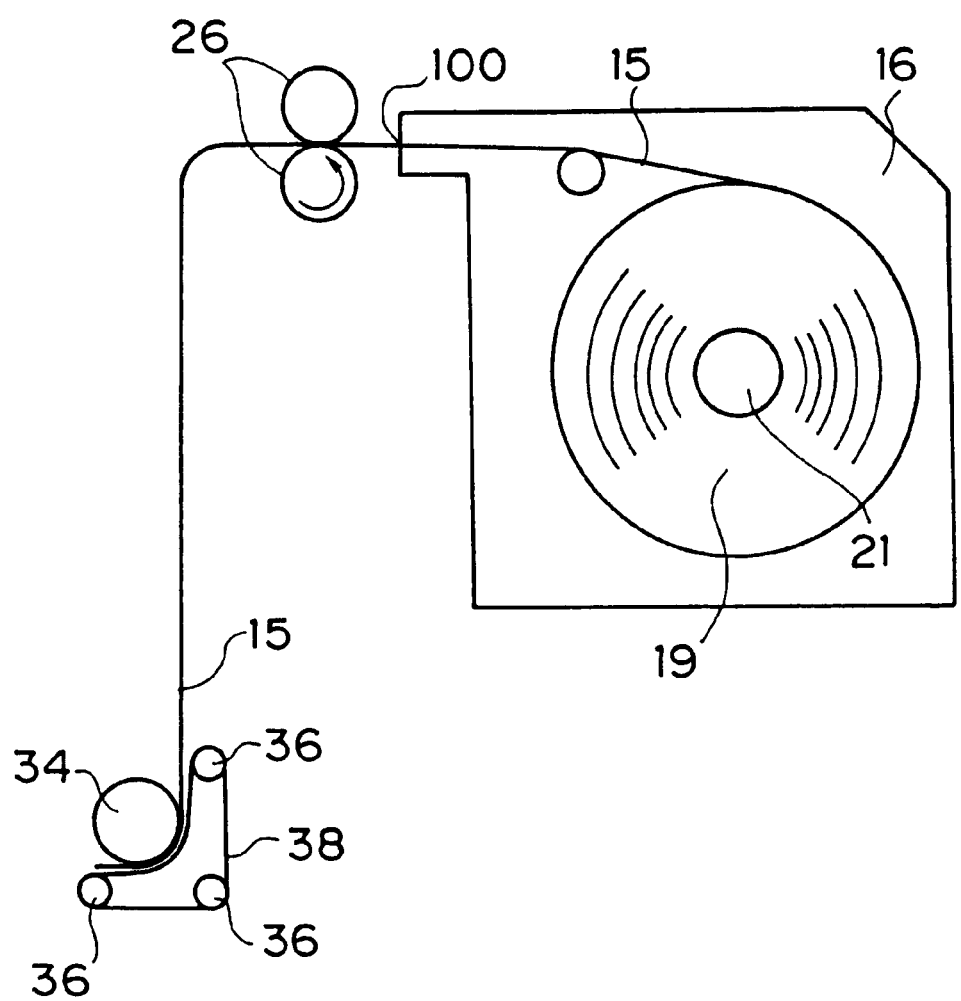
FIG. 4 is a schematic structural view of the main part of the conveyance path, and illustrates a state in which the photosensitive material has been pulled out from the magazine to the curved region of the path.

When the power source is turned on, or when the magazine 16 accommodating a new photosensitive material roll 19 is mounted to the mount 17, a standby device which is a part of the control device 23 uses the conveyance roller device 26 to pull out onto the conveyance path the leading edge of the photosensitive material 15 from the magazine 16, as shown in FIG. 3. Then, as shown in FIG. 4, the leading edge of the photosensitive material 15 is guided to the curved region of the conveyance path between the conveyance roller 34 and the endless belt 38 entrained about the guide rollers 36. The photosensitive material 15 is made to stand by at a position at which the leading edge is directed towards the exposure section 42. By making the photosensitive material 15 stand by in this manner, overall processing speed of the image recording device 10 is improved.

When the power source of the image recording device 10 is turned off, the entire photosensitive material 15 is rewound in the magazine 16 as shown in FIG. 3 to return to the initial state.

Control of ordinary processing for image recording of the photosensitive material 15 is not effected until preparatory operations have been performed by the standby device of the control device 23 and a processing order has been inputted by the operation keys, the keyboard 101 or the mouse 103. When the processing order has been inputted, the timer 25 is reset and processing is carried out.

Namely, the photosensitive material 15 is further pulled out from the magazine 16, guided (aligned) by the first alignment member 28, and conveyed in the conveyance section 18, whereby the standby device guides the photosensitive material 15 to the curved region of the conveyance path between the conveyance roller 34 and the endless belt 38 entrained about the guide rollers 36.

The puncher 32 then punches in the photosensitive material 15 a hole for detecting positional information, and the conveyance roller 34 changes by substantially 90° the direction in which the photosensitive material 15 is conveyed to thereby convey the photosensitive material 15 along a curve having a relatively small radius of curvature to the exposure section 42.

At the exposure section 42, the photosensitive material 15 is two-dimensionally scan-exposed with light beams emitted from the light beam scanning device 46 while being conveyed by the sub-scanning conveying device 44, whereby a latent image is formed on the photosensitive material 15.

Thereafter, the photosensitive material 15 is conveyed to the back-printing section 58, where the printing device 62 records various data, such as dates photographs represented by images on an original film were taken and dates images were recorded on the photosensitive material 15, on the back surface of the photosensitive material 15.

The photosensitive material 15 is then conveyed from the back-print section 58, through the first cutter 66 and stored in the reservoir 24.

The photosensitive material 15 conveyed from the reservoir 24 is conveyed by the conveying roller 68, passed through the cutter 72 and fed to the development section 78 by the final conveying roller 74 and the nip rollers 76.

Thereafter, the exposed photosensitive material 15 having the latent image formed thereon is developed, fixed and washed at the development section 78, and dried at the drying section 80. Finished prints made by cutting the long photosensitive material 15 with the third cutter 84 into image frames at predetermined lengths are sorted and accommodated in the sorter section 86.

In the image recording device 10, while the photosensitive material 15 is conveyed in accordance with the inputted order for processing, part of the long photosensitive material 15 is subjected to the processing by the puncher 32, the light beam scanning device 46 and the printing device 62. When a boundary between the processed and unprocessed portion of the long photosensitive material reaches the first cutter 66, the cutter 66 cuts the photosensitive material 15 at the boundary.

The processed portion of the photosensitive material 15 is conveyed from the reservoir 24 to the processor section 14, and subjected to subsequent processing. The leading edge of the unprocessed photosensitive material 15 is rewound onto the photosensitive material roll 19 by driving the unillustrated rewinding device mounted to the magazine 16 to rotate the axial member 21. In this way, the photosensitive material 15 pulled out from the photosensitive material roll 19 is rewound onto the photosensitive material roll 19.

The control device 23 includes the standby device as a control effected by the control device 23. As shown in FIG. 4, when the leading edge of the photosensitive material 15 reaches a position between the conveyance roller 34 and the endless belt 38 entrained around the guide rollers 36 just before the exposure section 42, which position is a curved region on the conveyance path having a relatively small radius of curvature, conveyance of the photosensitive material 15 is stopped so that the leading edge of the photosensitive material 15 is made to stand by (hereinafter, "standby position").

By utilizing the standby device to make the leading edge of the photosensitive material 15 stand by on the conveyance path, the leading edge of the photosensitive material 15 can be readily conveyed to the exposure section 42 when the next processing order is inputted to the image recording device 10, whereby exposure can be readily conducted and overall processing speed of the image recording device 10 can be increased.

The timer 25 begins counting when the above-described processing has been completed. Then, the image recording device 10 waits for a processing to be inputted.

Next, a description will be given of a retracting device operated by the control device 23 when processing is inactive.

The retracting device reads the count of the timer 25 that begins counting from the point in time when processing has been completed, and waits until a predetermined period of time elapses. After a predetermined period of time has elapsed, the retracting device retracts photosensitive material 15.

The retracting device is used to prevent the leading edge of the photosensitive material 15 from becoming plastically deformed and retaining the curved shape of the conveyance path (i.e., a curl having a small diameter) when the period of time in which the standby device makes the leading edge of the photosensitive material 15 stand by in the standby position becomes long.

Thus, the predetermined period of time, after elapse of which it is determined to retract the photosensitive material 15, is set to be shorter than the period of time in which the curved portion of the leading edge of the photosensitive material 15 is able to become plastically deformed enough to cause the photosensitive material 15 to become jammed in the image recording device 10 while being conveyed.

Figure 5:
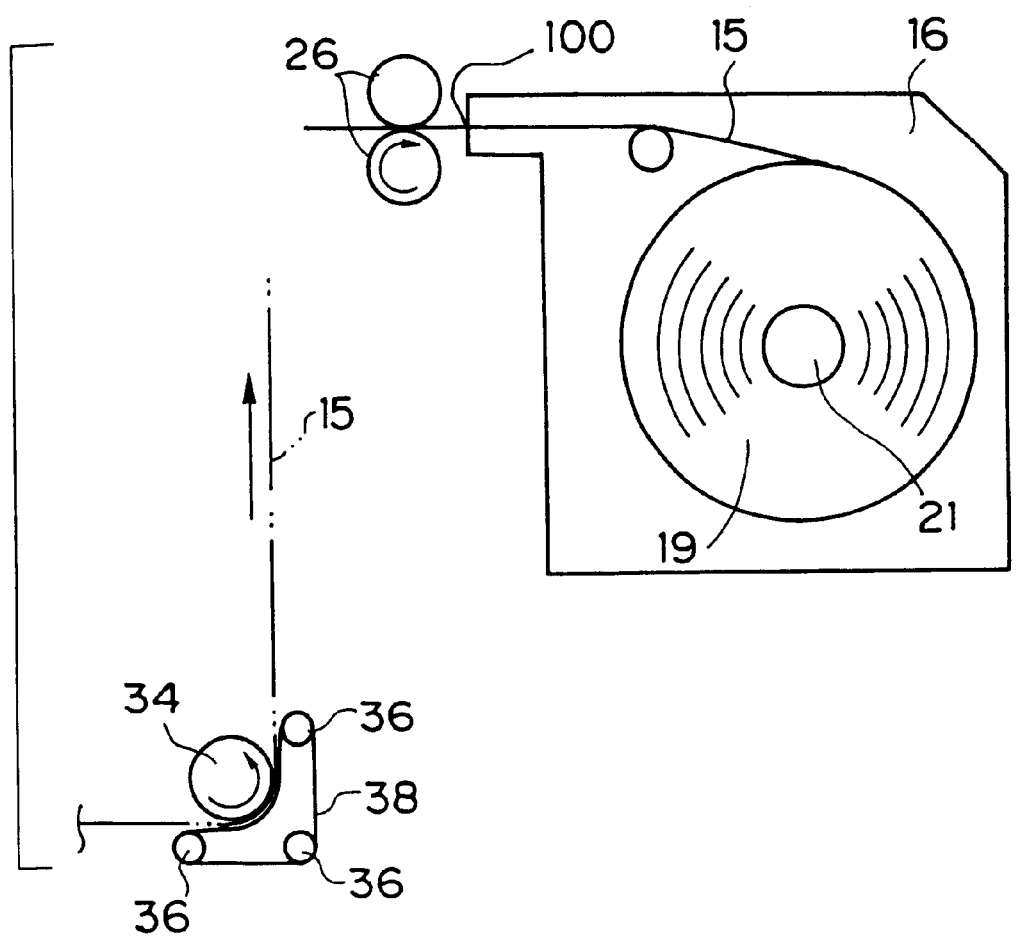
FIG. 5 is a schematic structural view of the main part of the conveyance path, and illustrates a state in which the photosensitive material has been retracted so that a leading edge of the photosensitive material is disposed in a downstream vicinity of conveyance rollers disposed adjacent to an opening of the magazine.
Figure 6:
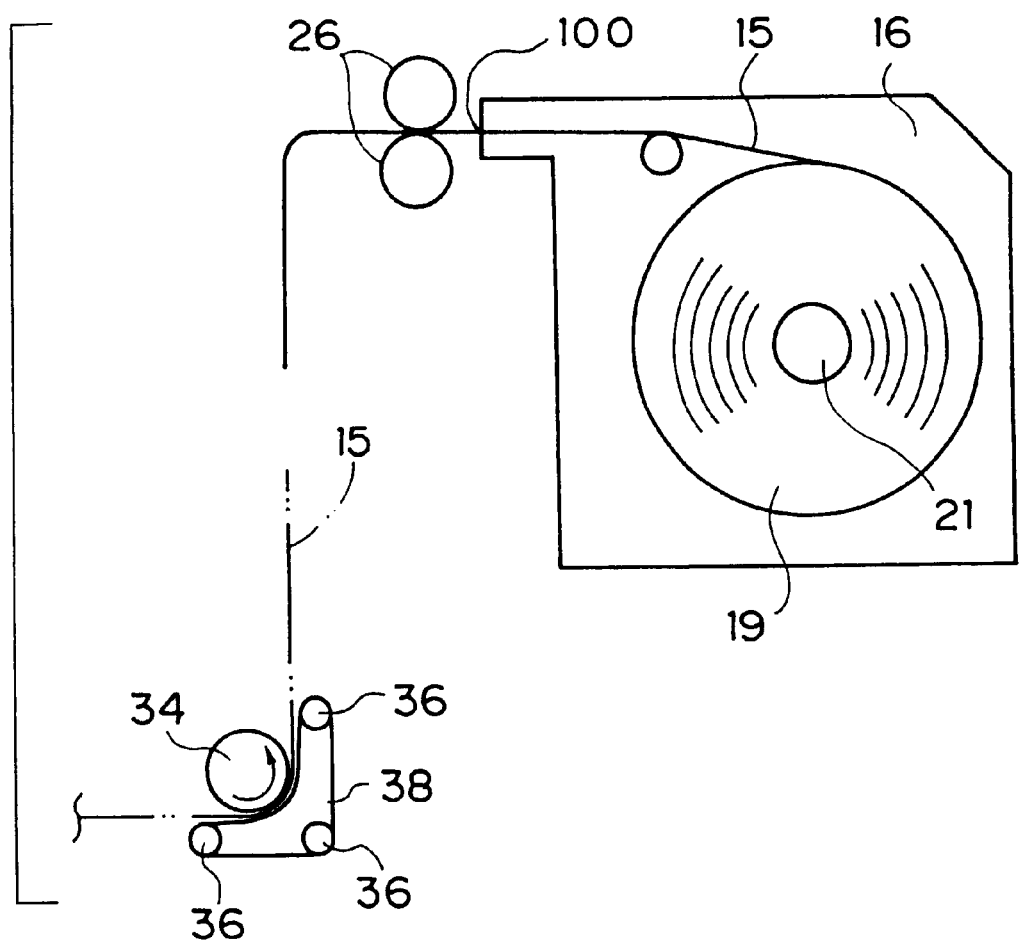
FIG. 6 is a schematic structural view of the main part of the conveyance path, and illustrates a state in which the leading edge of the photosensitive material has been retracted to a linear region of the conveyance path.
Figure 7:
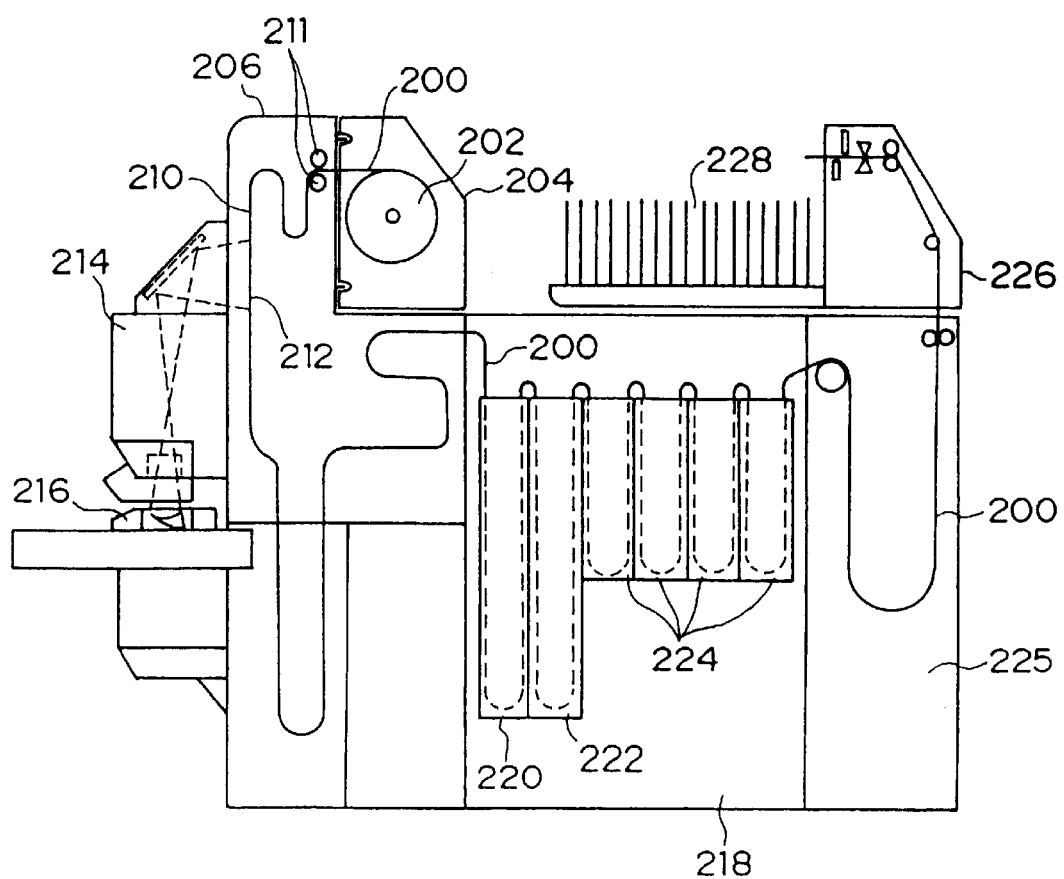
FIG. 7 is a schematic structural explanatory view showing a conventional image recording device.

The retracting device implements the control operation by which the rewinding device mounted to the magazine 16 rotates the axial member 21 to thereby rewind the photosensitive material 15 by a predetermined amount onto the photosensitive material roll 19, whereby the leading edge of the photosensitive material 15 is retracted from the standby position shown in FIG. 4 to a retraction position shown in FIG. 5 or FIG. 6.

The retraction position shown in FIG. 5 is one in which the rewinding device has rewound the photosensitive material 15 by a predetermined amount within the magazine 16 to thereby retract the leading edge of the photosensitive material 15 from the standby position to a position at which the leading edge is nipped by the conveyance roller device 26.

By rewinding the photosensitive material 15 onto the photosensitive material roll 19 within the magazine 16, so that the leading edge of the photosensitive material 15 is retracted to the position shown in FIG. 5, the photosensitive material 15 is prevented from retaining the curved shape of the conveyance path, even when the period of time in which the photosensitive material 15 is made to stand by becomes long.

The retraction position shown in FIG. 6 is one in which the rewinding device has rewound the photosensitive material 15 by a predetermined amount within the magazine 16 to thereby retract the leading edge of the photosensitive material 15 from the standby position to a position at which the leading edge is disposed on a linear region of the conveyance path.

By retracting the photosensitive material 15 so that the leading edge thereof is disposed at a retraction position along a linear region of the conveyance path or along a curve on the conveyance path having a relatively large radius of curvature, and by holding the leading edge at a substantially linear disposition, the photosensitive material 15 is prevented from retaining the curved shape of the conveyance path, even when the period of time in which the photosensitive material 15 is made to stand by becomes long.

After the photosensitive material 15 has been retracted, the photosensitive material 15 is made to stand by until it is determined that a processing order has been inputted. This is determined when indication is detected that an operator has begun inputting an order to implement image recording, i.e., when it is detected that an operator has operated any key on the keyboard 101 or various operation keys disposed at the image processing section 20, or when an operator has moved the mouse 103.

The reason that detection of the aforementioned indication is used to determine that a processing order has been inputted is because the indication serves as an appropriate index for preparing to start processing.

When the control device 23 has detected that an operation key disposed at the image processing section 20 or a key on the keyboard 101 has been operated, or that the mouse 103 has been moved, the timer 25 is reset in order to prepare to start processing, and a device for returning the photosensitive material 15 is operated.

The return device is operated as a control operation by the control device 23. The return device moves the leading edge of the photosensitive material 15 from the retraction position shown in either FIG. 5 or FIG. 6 to the standby position shown in FIG. 4, whereby the leading edge of the photosensitive material 15 is made to stand by.

In a case in which processing orders are inputted intermittently, if the period of time in which the image recording device 10 is inactive becomes longer than the predetermined period of time that has been set to be shorter than the period of time in which the leading edge of the photosensitive material 15 is able to become plastically deformed enough to cause the photosensitive material 15 to become jammed in the image recording device 10, the photosensitive material 15 is moved from a state in which the leading edge thereof is curved to a state in which the leading edge is more largely curved or in which the leading edge is linearly extended.

Hence, it is possible to prevent the leading edge of the photosensitive material 15 from retaining the shape of the conveyance path, to prevent the photosensitive material 15 from becoming jammed in the image recording device 10 due to the curled leading edge being advanced by the conveying device on nonlinear regions of the conveyance path, and to prevent conveyance of the photosensitive material 15 from becoming hindered.

Moreover, it is also possible to prevent finished prints from being curled after the photosensitive material has been subjected to various image recording processes and an image has been recorded on the photosensitive material.

When an operation key disposed at the image processing section 20 or any key on the keyboard 101 has been operated, or when the mouse 103 has been moved, there is a high probability that an operator is inputting a processing order. Thus, the leading edge of the photosensitive material 15 is automatically conveyed from the retraction position shown in either FIG. 5 or FIG. 6 to the standby position shown in FIG. 4 and made to stand by.

When an operator has finished inputting the processing order, the processing can be readily performed to reduce processing time.

Although the image recording device 10 of the present embodiment employs the magazine 16 for accommodating the photosensitive material roll 19, the present invention is not limited to the same. Instead of the magazine 16, the image recording device 10 can also employ a feed cassette for storing a plurality of photosensitive materials that have been pre-cut into a predetermined size. In this case, the retracting device for retracting the photosensitive material 15 when processing is inactive can also be applied to the image recording device 10 disposed with the feed cassette.

When the retracting device is applied to the image recording device 10 disposed with the feed cassette, the leading edge of the photosensitive material 15, which is made to stand by at a curved region of the conveyance path having a relatively small radius of curvature, can be moved to a curved region of the conveyance path having a relatively large radius of curvature or to a linear region of the conveyance path, or to a retraction position within the feed cassette.

The retracting device described above can also be utilized in devices other than the image recording device 10 of the present embodiment, such as printers in which a photosensitive material is cut into a sheet and thereafter exposed, or ordinary direct-exposure printers. Moreover, the retracting device can be used not only in photoprinters but also in image recording devices that use heat-development photosensitive materials and light- and heat-sensitive materials.

In the image recording device of the present invention, before processing for recording an image on the photosensitive material is performed, the standby device conveys the leading edge of the photosensitive material to the standby position at a curved region on the conveyance path having a relatively small radius of curvature, whereby the photosensitive material is made to stand by. Before the leading edge of the photosensitive material is able to become plastically deformed enough to cause the photosensitive material to become jammed in the image recording device, the retracting device moves the leading edge of the photosensitive material to the retraction position, where the leading edge is disposed along a linear region of the conveyance path or along a curve on the conveyance path having a relatively large radius of curvature. Therefore, the retracting device moves the leading edge to the retracted state before the curved leading edge is able to retain the shape of the curved region of the conveyance path at which it was made to stand by and cause the photosensitive material to become jammed in the image recording device. In this manner, even if the period of time in which the photosensitive material is made to stand by becomes long, it is possible to prevent the leading edge of the photosensitive material from retaining the curved shape of the conveyance path. Hence, it is possible to prevent the photosensitive material from becoming jammed in the image recording device when the curled leading edge is advanced by the conveying device on the serpentine conveyance path, and to prevent conveyance of the photosensitive material from becoming hindered. Moreover, it is also possible to prevent finished prints from being curled after the photosensitive material has been subjected to various image recording processes and an image has been recorded on the photosensitive material.

What is claimed is:

1. An image recording device comprising:
    a standby device for conveying, before processing for recording an image on a photosensitive material is implemented, a leading edge of the photosensitive material to a standby position at a curved region on a conveyance path, with the curved region having a relatively small radius of curvature, to thereby make the leading edge of the photosensitive material stand by; and
    a retracting device for moving, before the leading edge of the photosensitive material retains a curved shape of the conveyance path enough to cause the photosensitive material to become jammed in the image recording device, the leading edge of the photosensitive material to a retraction position, the retraction position being one of a position at which the leading edge can be held linearly on the conveyance path and a position at which the leading edge can be held along a curve, on the conveyance path, having a relatively large radius of curvature.

2. The image recording device of claim 1, wherein the retraction position is one of in the vicinity of and within a magazine for accommodating a long roll of the photosensitive material.

3. The image recording device of claim 1, wherein the retraction position is within a feed cassette for accommodating the photosensitive material that has been cut into a predetermined size.

4. An image recording device comprising:
    a standby device for conveying, before processing for recording an image on a photosensitive material is implemented, a leading edge of the photosensitive material to a standby position at a curved region on a conveyance path, with the curved region having a relatively small radius of curvature, to thereby make the leading edge of the photosensitive material stand by;
    a retracting device for moving, before the leading edge of the photosensitive material retains a curved shape of the conveyance path enough to cause the photosensitive material to become jammed in the image recording device, the leading edge of the photosensitive material to a retraction position, the retraction position being one of a position at which the leading edge can be held linearly on the conveyance path and a position at which the leading edge can be held along a curve, on the conveyance path, having a relatively large radius of curvature; and a return device for returning the leading edge of the photosensitive material that is retracted at the retraction position to the standby position on the conveyance path when indication that input of an order to implement image recording has begun is detected.

5. The image recording device of claim 4, wherein the retraction position is one of in the vicinity of and within a magazine for accommodating a long roll of the photosensitive material.

6. The image recording device of claim 4, wherein the retraction position is within a feed cassette for accommodating the photosensitive material that has been cut into a predetermined size.

7. The image recording device of claim 4, further comprising a control device for controlling the standby device, the retracting device and the return device.

8. The image recording device of claim 7, wherein the control device includes a timer, and when a period of time at which the leading edge of the photosensitive material is positioned at the standby position is equal to or exceeds a predetermined amount of time counted by the timer, the leading edge of the photosensitive material is moved from the standby position to the retraction position.

9. The image recording device of claim 4, further comprising an input device including at least one of an operation key, an exterior mouse and an exterior keyboard for inputting an order to implement processing for image recording.

10. The image recording device of claim 9, wherein the return device returns the leading edge of the photosensitive material that is retracted at the retraction position to the standby position on the conveyance path when it has been detected that the operation key has been operated.

11. The image recording device of claim 9, wherein the return device returns the leading edge of the photosensitive material that is retracted at the retraction position to the standby position on the conveyance path when operation of the exterior mouse is detected.

12. The image recording device of claim 9, wherein the return device returns the leading edge of the photosensitive material that is retracted at the retraction position to the standby position on the conveyance path when operation of the exterior keyboard is detected.

13. An image recording device including an exposure section for printing an image onto a photosensitive material, the image recording device comprising:

a standby device for conveying, before processing for recording the image on the photosensitive material is implemented, a leading edge of the photosensitive material along a conveyance path including linear and curved regions to a standby position near the exposure section, to thereby make the leading edge of the photosensitive material stand by;

a retracting device for moving, before the leading edge of the photosensitive material standing by at the standby position retains a curved shape of the conveyance path enough to cause the photosensitive material to become jammed in the image recording device, the leading edge of the photosensitive material to a retraction position, the retraction position being one of a position at which the leading edge can be held linearly on the conveyance path and a position at which the leading edge can be held along a curve, on the conveyance path, having a relatively large radius of curvature; and a return device for returning the leading edge of the photosensitive material that is retracted at the retraction position to the standby position on the conveyance path when indication that input of an order to implement image recording has begun is detected.

14. The image recording device of claim 13, wherein the retraction position is one of in the vicinity of and within a magazine for accommodating a long roll of the photosensitive material.

15. The image recording device of claim 13, wherein the retraction position is within a feed cassette for accommodating the photosensitive material that has been cut into a predetermined size.

16. The image recording device of claim 13, further comprising an input device for inputting an order to implement processing for image recording.

17. The image recording device of claim 16, wherein the return device returns the leading edge of the photosensitive material that is retracted at the retraction position to the standby position on the conveyance path when it has been detected that the input device has been operated.

18. The image recording device of claim 17, further comprising a control device for controlling the standby device, the retracting device and the return device.

19. The image recording device of claim 18, wherein the control device includes a timer, and when a period of time at which the leading edge of the photosensitive material is positioned at the standby position is equal to or exceeds a predetermined amount of time counted by the timer, the leading edge of the photosensitive material is moved from the standby position to the retraction position.

* * * * *